(12) United States Patent
Fu et al.

(10) Patent No.: US 8,529,723 B2
(45) Date of Patent: Sep. 10, 2013

(54) PROCESS OF EXPEDITING ACTIVATION OF HEAT-EXPANDABLE ADHESIVES/COATINGS USED IN MAKING PACKAGING SUBSTRATES

(75) Inventors: Thomas Z. Fu, Naperville, IL (US); Matthew R. Cook, Hinsdale, IL (US)

(73) Assignee: LBP Manufacturing, Inc., Cicero, IL (US)

( * ) Notice: Subject to any disclaimer, the term of this patent is extended or adjusted under 35 U.S.C. 154(b) by 47 days.

(21) Appl. No.: 13/218,947

(22) Filed: Aug. 26, 2011

(65) Prior Publication Data
US 2012/0048450 A1    Mar. 1, 2012

Related U.S. Application Data

(60) Provisional application No. 61/379,030, filed on Sep. 1, 2010.

(51) Int. Cl.
*B32B 37/14*    (2006.01)

(52) U.S. Cl.
USPC ..................................................... 156/272.2

(58) Field of Classification Search
USPC ............................................... 156/83, 272.2
See application file for complete search history.

(56) References Cited

U.S. PATENT DOCUMENTS

| | | |
|---|---|---|
| 1,295,300 A | 2/1919 | Galibert |
| 2,661,889 A | 12/1953 | Phinney |
| 2,853,222 A | 9/1958 | Gallagher |
| 2,998,501 A | 8/1961 | Edberg et al. |
| 3,037,897 A | 6/1962 | Pelley |
| 3,237,834 A | 3/1966 | Davis et al. |
| 3,537,929 A | 11/1970 | Keith et al. |
| 3,813,801 A | 6/1974 | Vander Schaaf |
| 3,988,521 A | 10/1976 | Fumel et al. |

(Continued)

FOREIGN PATENT DOCUMENTS

| | | |
|---|---|---|
| CA | 2647912 A1 | 11/2007 |
| EP | 0 818 305 A2 | 1/1998 |

(Continued)

OTHER PUBLICATIONS

Invitation to Pay Additional Fees and, Where Applicable, Protest Fee and Communication Relating to the Results of the Partial International Search, dated Mar. 27, 2012 (7 pages).

(Continued)

*Primary Examiner* — Daniel McNally
(74) *Attorney, Agent, or Firm* — Nathan O. Greene; Brinks Hofer Gilson & Lione

(57) ABSTRACT

A method for manufacturing a multilayer sheet material includes, at some point during passage of the sheet material through a machine system, heating the multilayer sheet material with a microwave heater to expand a heat-expandable adhesive or coating applied to or within the multilayer sheet material. Various types of multilayer substrates may be created depending on the steps used and the application of the heat-expandable adhesive or coating. Additionally, a monolayer sheet may be coated with a pattern of heat-expandable coating before passage of the monolayer sheet through the machine system that heats the monolayer sheet to expand the heat-expandable coating applied to the monolayer sheet. The microwave heater used by the machine system may be a planar type and have a plurality of microwave guides surrounding a space through which the sheet material(s) pass. The microwave heater may be operable at multiple frequencies.

14 Claims, 7 Drawing Sheets

(56) References Cited

U.S. PATENT DOCUMENTS

| | | | |
|---|---|---|---|
| 4,261,501 A | 4/1981 | Watkins et al. | |
| 4,435,344 A | 3/1984 | Iioka | |
| 4,483,889 A | 11/1984 | Andersson | |
| 4,783,287 A | 11/1988 | Eichberger et al. | |
| 5,145,107 A | 9/1992 | Silver et al. | |
| 5,326,019 A | 7/1994 | Wolff | |
| 5,385,260 A | 1/1995 | Gatcomb | |
| 5,490,631 A * | 2/1996 | Iioka et al. | 229/403 |
| 5,542,599 A | 8/1996 | Sobol | |
| 5,685,480 A * | 11/1997 | Choi | 229/403 |
| 5,697,550 A | 12/1997 | Varano et al. | |
| 5,775,577 A | 7/1998 | Titus | |
| 5,826,786 A | 10/1998 | Dickert | |
| 5,950,917 A | 9/1999 | Smith | |
| 5,952,068 A | 9/1999 | Neale et al. | |
| 5,993,705 A * | 11/1999 | Grishchenko et al. | 264/46.4 |
| 6,039,682 A | 3/2000 | Dees et al. | |
| 6,152,363 A | 11/2000 | Rule, Jr. | |
| 6,186,394 B1 | 2/2001 | Dees et al. | |
| 6,224,954 B1 | 5/2001 | Mitchell | |
| 6,257,485 B1 | 7/2001 | Sadlier et al. | |
| 6,265,040 B1 | 7/2001 | Neale et al. | |
| 6,267,837 B1 | 7/2001 | Mitchell | |
| 6,277,454 B1 | 8/2001 | Neale et al. | |
| 6,287,247 B1 | 9/2001 | Dees | |
| 6,287,410 B1 * | 9/2001 | Klemarewski | 156/273.7 |
| 6,536,657 B2 | 3/2003 | Van Handel | |
| 6,586,075 B1 | 7/2003 | Mitchell | |
| 6,729,534 B2 | 5/2004 | Van Handel | |
| 6,787,245 B1 | 9/2004 | Hayes | |
| 6,802,938 B2 | 10/2004 | Mohan et al. | |
| 6,811,843 B2 | 11/2004 | DeBraal et al. | |
| 6,919,111 B2 | 7/2005 | Swoboda et al. | |
| 6,926,197 B2 | 8/2005 | Hed et al. | |
| 7,281,650 B1 | 10/2007 | Milan | |
| 7,451,911 B2 | 11/2008 | Stepanek, Jr. | |
| 7,464,856 B2 | 12/2008 | Van Handel | |
| 7,464,857 B2 | 12/2008 | Van Handel | |
| 7,597,246 B2 | 10/2009 | Stepanek, Jr. | |
| 7,600,669 B2 | 10/2009 | Van Handel | |
| 7,614,993 B2 | 11/2009 | Van Handel | |
| 2002/0068139 A1 | 6/2002 | Polak et al. | |
| 2002/0071947 A1 | 6/2002 | Soane et al. | |
| 2002/0172818 A1 | 11/2002 | DeBraal et al. | |
| 2002/0182347 A1 | 12/2002 | DeBraal et al. | |
| 2003/0003251 A1 | 1/2003 | DeBraal et al. | |
| 2004/0011801 A1 | 1/2004 | Rodriguez | |
| 2005/0003122 A1 | 1/2005 | DeBraal et al. | |
| 2005/0230405 A1 | 10/2005 | Dix | |
| 2005/0236468 A1 | 10/2005 | Sadlier | |
| 2006/0131316 A1 | 6/2006 | Bresler | |
| 2006/0144915 A1 | 7/2006 | Sadlier | |
| 2006/0196923 A1 | 9/2006 | Tedford, Jr. | |
| 2007/0029036 A1 | 2/2007 | Fort et al. | |
| 2007/0228134 A1* | 10/2007 | Cook et al. | 229/403 |
| 2008/0023538 A1 | 1/2008 | Robertson et al. | |
| 2008/0087677 A1 | 4/2008 | Robertson et al. | |
| 2008/0121681 A1 | 5/2008 | Wiedmeyer | |
| 2009/0121007 A1 | 5/2009 | Van Handel | |
| 2009/0214837 A1 | 8/2009 | Albenice et al. | |
| 2009/0272736 A1 | 11/2009 | Cole | |
| 2009/0294520 A1 | 12/2009 | Stepanek, Jr. | |
| 2009/0321508 A1 | 12/2009 | Fu et al. | |
| 2010/0015374 A1 | 1/2010 | Fulwiler | |
| 2010/0044424 A1 | 2/2010 | Van Handel | |
| 2011/0081509 A1 | 4/2011 | Chang | |

FOREIGN PATENT DOCUMENTS

| | | |
|---|---|---|
| FR | 2 516 447 A1 | 5/1983 |
| FR | 2 865 476 | 7/2005 |
| GB | 1 116 349 A | 6/1968 |
| JP | 2000-302178 | 10/2000 |
| JP | 2003-154589 | 5/2003 |
| JP | 2003-155077 | 5/2003 |
| JP | 2003-531928 | 10/2003 |
| JP | 2005-517078 | 6/2005 |
| KR | 2011-0123720 | 11/2011 |
| TW | 215666 | 11/1993 |
| WO | WO 00/06637 A1 | 2/2000 |
| WO | WO 00/15405 A1 | 3/2000 |
| WO | WO 2004/113613 A1 | 12/2004 |
| WO | WO 2005/102847 A1 | 11/2005 |
| WO | WO 2006/107636 A1 | 10/2006 |
| WO | WO 2006/113403 A2 | 10/2006 |
| WO | WO 2007/018899 A2 | 2/2007 |
| WO | WO 2007/027712 A1 | 3/2007 |
| WO | WO 2007/126783 A1 | 11/2007 |
| WO | WO 2010/151456 A1 | 12/2010 |
| WO | WO 2012/033998 A2 | 3/2012 |
| ZA | 9900835 | 2/1999 |

OTHER PUBLICATIONS

Examination Report and English translation of corresponding Vietnamese Patent Application No. 1-2008-02687, 2pp., dated Sep. 13, 2010.

Examination Report from corresponding Australian Patent Application No. 2007245165, 2pp., dated Sep. 17, 2011.

Examination Report from corresponding European Patent Application No. 07754092.0, 2pp., dated Jan. 19, 2009.

Examination Report from corresponding Malaysian Patent Application No. PI20083914, 3pgs., dated Sep. 15, 2011.

Examination Report from corresponding New Zealand Patent Application No. 571637, 2pp., dated Mar. 5, 2010.

Examination Report from corresponding New Zealand Patent Application No. 593231, 1p., dated Sep. 16, 2011.

Examination Report from corresponding New Zealand Patent Application No. 593231, 2pp., dated Jun. 9, 2011.

Examination Report from corresponding Russian Patent Application No. 2008141055, 5pp., dated Oct. 14, 2009.

Examination Report from corresponding Singapore Patent Application No. 200807307-4, 5pp., dated Oct. 30, 2009.

Examination Report, from corresponding Turkish Patent Application No. 2008/09185, 3pp., dated May 28, 2009.

Further Examination Report from corresponding New Zealand Patent Application No. 571637, 2pp., dated Jul. 1, 2010.

International Preliminary Examination Report on Patentability from corresponding International Application No. PCT/US2007/007521, 6pp., dated Oct. 8, 2008.

International Preliminary Report on Patentability and Written Opinion of the International Search Authority from corresponding International Application No. PCT/US2010/038677, 6pp., dated Jan. 4, 2012.

International Search Report and Written Opinion from corresponding International Application No. PCT/US2007/007521, 8pp., dated Sep. 13, 2007.

International Search Report and Written Opinion from corresponding International Application No. PCT/US2010/038677, 8pp., dated Sep. 24, 2010.

Office Action from corresponding Chinese Patent Application No. 200780018298.7, 13pp., dated May 16, 2011.

Office Action from corresponding Chinese Patent Application No. 200780018298.7, 3pp., dated Jan. 20, 2012.

Office Action from corresponding Chinese Patent Application No. 200780018298.7, 9pp., dated Aug. 27, 2012.

Office Action from corresponding Chinese Patent Application No. 200780018298.7, 14pp., Feb. 5, 2010.

Office Action from corresponding Chinese Patent Application No. 200780018298.7, 12pp., Aug. 27, 2010.

Office Action from corresponding Japanese Patent Application No. 2009-504204, 5pp., dated Sep. 10, 2012.

Office Action from corresponding Japanese Patent Application No. 2009-504204, 9pp., dated May 7, 2012.

Office Action from corresponding Philippine Patent Application No. 1-2008-502222, 2pp., May 14, 2012.

Office Action from corresponding Taiwanese Patent Application No. 96111303, 5pp., Jun. 7, 2010.

Partial European Search Report from corresponding European Patent Application No. EP 10 00 6809, 7pp. dated Sep. 2, 2010.

Patent Examination Report from corresponding Australian Patent Application No. 2012200444, 3 pp., Jun. 26, 2012.
Search Report and Written Opinion from corresponding Singapore Patent Application No. 2010001881, 18pp., dated Jun. 29, 2010.
Written Opinion from corresponding Singapore Patent Application No. 200807307-4, 8pp., dated Feb. 17, 2009.

Written Opinion from corresponding Singapore Patent Application No. 201109426-5, 5pp., dated Jul. 26, 2012.
Examiner's Report from corresponding Canadian Patent Application No. 2,766,553, 2 pp., dated Jan. 16, 2013.

* cited by examiner

PROCESS OF EXPEDITING ACTIVATION OF HEAT-EXPANDABLE ADHESIVES/COATINGS USED IN MAKING PACKAGING SUBSTRATES

REFERENCE TO EARLIER FILED APPLICATION

This application claims the benefit under 35 U.S.C. §119 (e) of U.S. Provisional Patent Application No. 61/379, 030, filed Sep. 1, 2010, and titled "PROCESS OF EXPEDITING ACTIVATION OF HEAT-EXPANDABLE ADHESIVES/ COATINGS USED IN MAKING PACKAGING SUBSTRATES," which is incorporated, in its entirety, by this reference. This application further claims priority as a continuation-in-part (CIP) of U.S. patent application Ser. No. 13/532,489, filed Jun. 25, 2012, and titled "INSULATING PACKAGING," which is a CIP of of U.S. patent application Ser. No. 12/490,121, filed Jun. 23, 2009, and titled "INSULATING PACKAGING," which is a CIP of U.S. patent application Ser. No. 11/728,973, filed Mar. 27, 2007, and titled "THERMALLY ACTIVATABLE INSULATING PACKAGING," which claims priority to U.S. Provisional Patent Application No. 60/789,297, filed Mar. 3, 2006, and titled "TEMPERATURE ACTIVATABLE INSULATING PACKAGING," all of which are herein incorporated by reference.

BACKGROUND

Consumers frequently purchase ready-made products, such as food and beverages and other products, in containers made from packaging substrates. Thermally-insulated containers may be designed for hot or cold liquids or foods, such as hot coffee, iced-tea, or pizza. These containers may maintain the temperature of the liquid or food contents by reducing heat or cold transfer from the contents to the hand of the consumer.

To help insulate the hand of the consumer from the heat or cold of the contents of a food or beverage container, heat-expandable adhesives and coatings have been developed for micro-fluted board or other packaging substrates. Such expandable adhesives and coatings expand upon being heated over a certain temperature.

BRIEF SUMMARY

A method is disclosed for heating up sheet or roll web material ("sheet material") and other substrates for containers with a microwave heater during the manufacturing process, causing a heat-expandable adhesive or coating applied to the sheet material or substrates to rapidly expand, expediting activation thereof. The heat-expandable adhesive or coating expands to provide insulation and rigidity to the material, which helps converting the materials to packages or containers, and keeps fluid and solid contents of the containers cold or hot, and to insulate such contents from human contact during handling of the containers. The method is fully automated and uses roll and or other sheet materials such as single face material and fluted board material. The heat-expandable adhesive or coating may be a composition of a few expandable microspheres per weight of starch or other binders and suitable compositions such as those discussed later. The material heated by the microwave heater at various points of the process, but especially after the application of the heat-expandable adhesive or coating. A multilayered sheet material may be laminated and conveyed to final processing, such as to be printed, die cut, removed from blanks, and/or otherwise assembled in containers. A monolayer sheet may also be patterned with a heat-expandable coating, which after being heated, may also be directly processed into containers.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
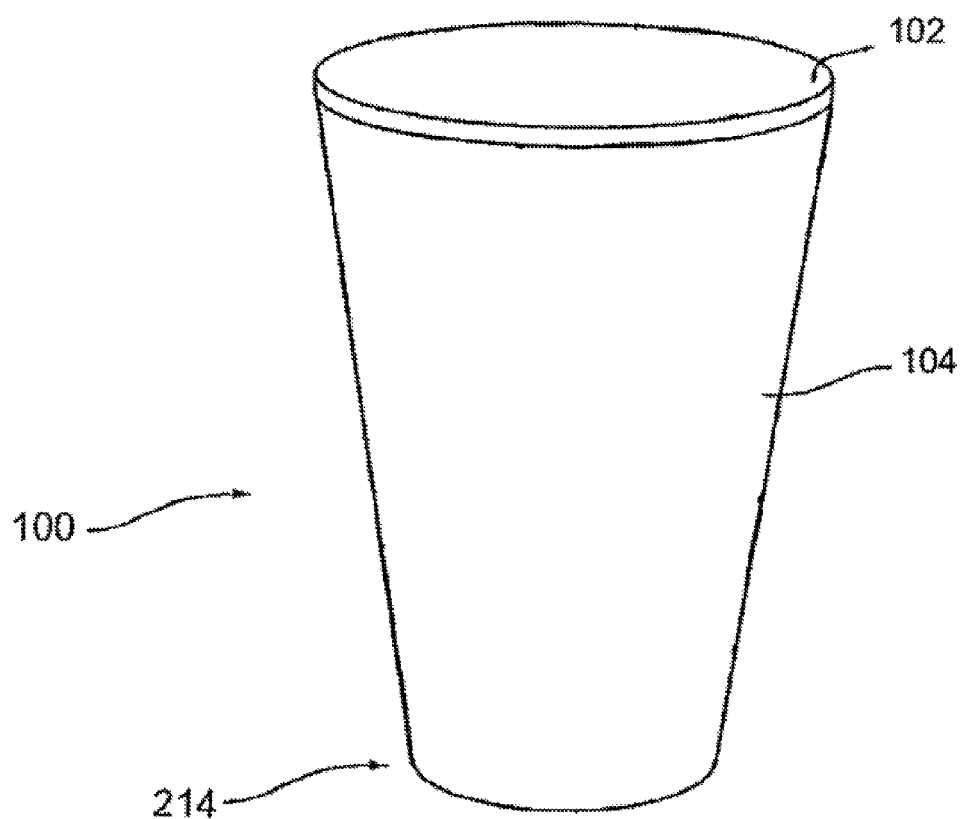
FIG. 1 is a perspective view of a cup assembled with an outer wall.

A package, container, or container sleeve may be constructed of, and/or insulated with an insulating material such as an expandable adhesive or coating. The insulating material may be fixed to a container or it may be applied to a removable sleeve, whether before or after formation of packaging material or substrate into the shape of the container. Insulating material, such as thermally-expandable material may be applied to the container or within a container material, or may be applied to an outer wall of a container, or to a combination of these. The insulating material may be expanded before reaching an end user, such as when the container and/or the container sleeve are manufactured, and/or the insulating material may be expanded only on end use and only in response to, for example, temperature. The insulating material may be used to aid with insulating capabilities of the container and/or the container sleeve, and/or to add rigidity to the container and/or the container sleeve, such as to reduce a thickness of the material components of the container and/or the container sleeve.

The sheet material used to make the package, container, and/or container sleeve may be manufactured on a conveyor-type machine system, in an automated assembly-line process, which will be discussed in more detail later. The expandable adhesive or coating may be applied by conventional application methods, such as roll application, or sprayed on or otherwise applied to sheet material, for instance onto a corrugated medium before a liner is laminated onto it. The expandable adhesive or coating may thus be located between two layers of some sort of sheet material before being expanded during the manufacturing process. When the insulating material is a coating, the insulating material may be applied to a monolayer (or single) sheet or to an outside surface of a multilayer sheeting before expansion by heat. Additionally or alternatively, the expandable adhesive or coating may be expanded by heat before being trapped between two sheets of material. Other embodiments are likewise possible, as discussed later.

In some embodiments, the heat-expandable adhesives/coatings are heated during a conveyor-type machine assembly process so the expansion occurs when the containers are manufactured. With conventional machine systems, the source of heat has been by a temperature source such as from a heat gun or an infrared (IR) heater or lamp. Conventional heating methods, such as a hot air oven and/or an infrared heater installed in-line on a machine system are not effective to adequately activate heat-expandable microspheres at production speed, typically 250 feet per minute (fpm) to 600 fpm. This is due, in part, to the space and heat power limitations and due to the heating mechanism of these methods primarily based on conduction, convection, and radiation. With these sources of heat, accordingly, technical issues are exhibited in limited thermal energy, low expansion efficiency, and therefore, lower process speeds. A lower speed slows down production of the containers by the conventional machine system.

It is proposed in the present disclosure to apply microwave energy from an industrial microwave heater adapted to radiate over the sheet material passing through it during the process. Accordingly, the microwaves from the microwave heater energize the expandable adhesive or insulation coating, causing them to heat up much more quickly than they would from a thermal temperature or other heat source. This is due to the large amount of heat absorbed by water and other polar molecules in the heat-expandable adhesives/coatings in a very short time. For instance, expandable microspheres mixed into the adhesives/coatings may expand rapidly when the mixture in which the microspheres are located quickly heats up from exposure to the powerful microwave energy.

The heat-expandable adhesives or insulating materials may include starch-based glues, may be synthetics-based, and may be applied in corrugated board production as laminating adhesive to render higher bulk, paper reduction, or both. The corrugated boards in turn can be converted into many useful food and non-food corrugated packaging products, for example, but not limited to, fluted sleeves, microfluted clamshells, and E-fluted box and bag-in-boxes. These heat-expandable adhesives/coatings can be applied in a conventional corrugators or laminator, and expanded with the assistance of an industrial microwave heater to boost efficiency and speed. Other heat-expandable coatings can be applied onto paper substrates in full coverage or in patterns, and subsequently expanded by the microwave heater to create a foam layer or textures with different end-use benefits, some of which will be explained below.

Figure 4:
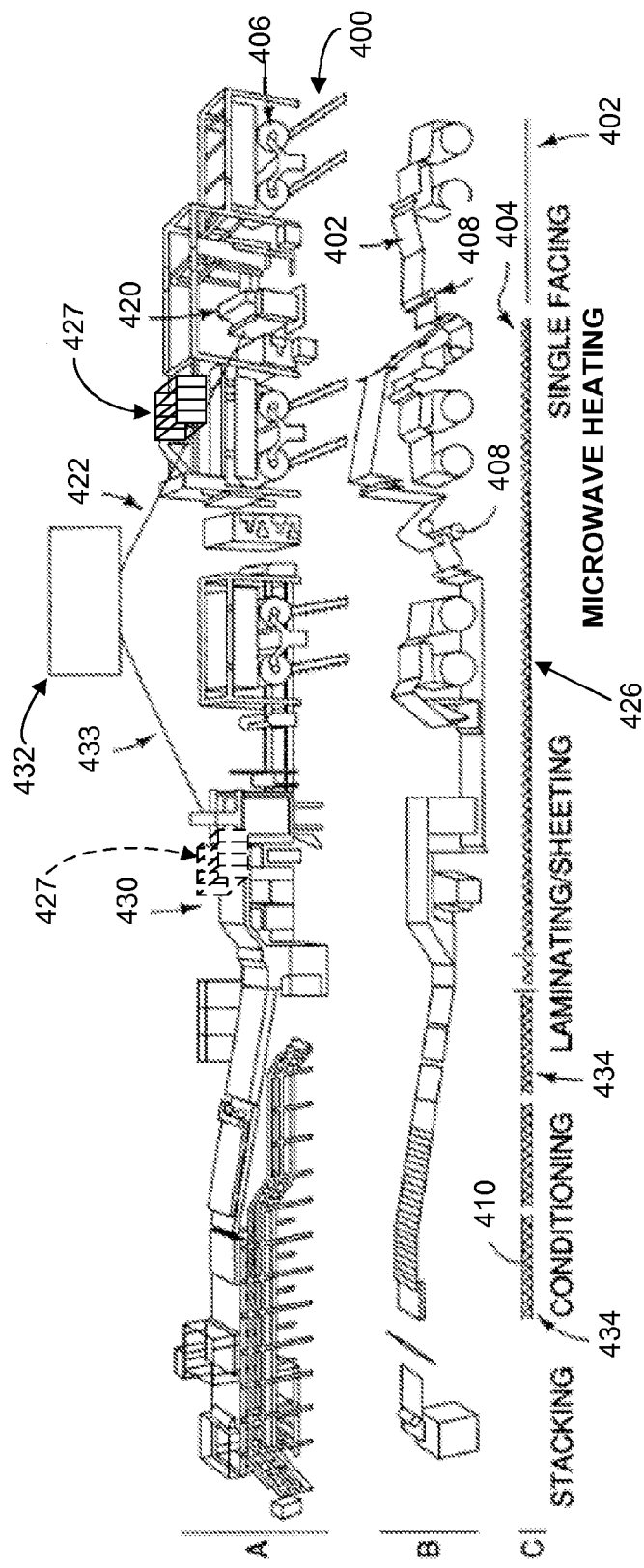
FIG. 4 is a view of an exemplary machine system for making packaging materials and substrate for containers.
Figure 5:
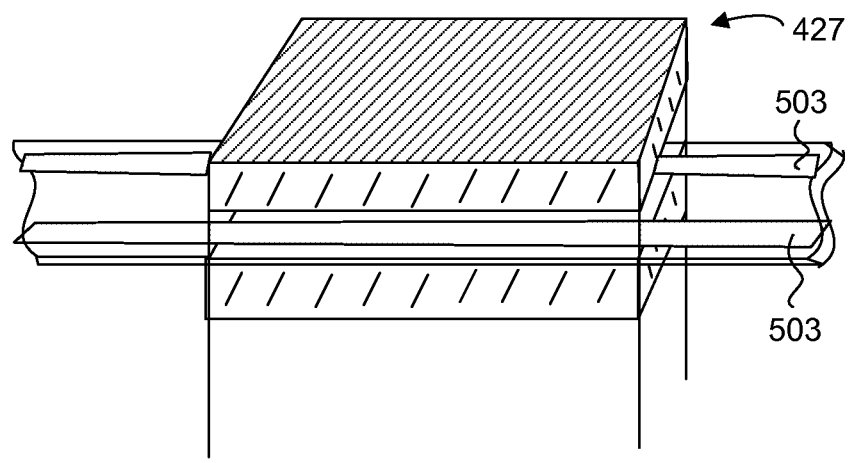
FIG. 5 is a perspective schematic view of an exemplary industrial microwave heater as positioned over conveyor belts.
Figure 6:
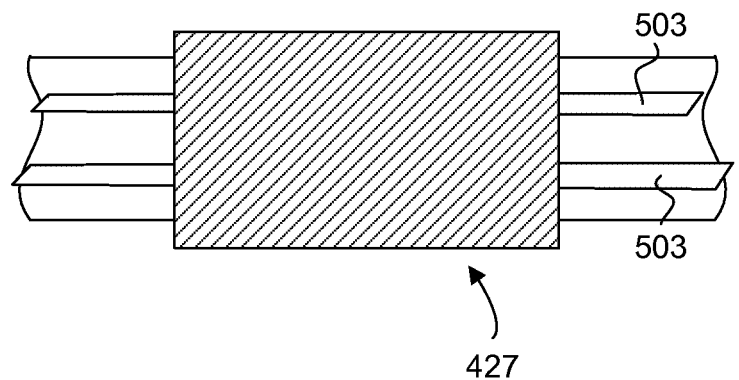
FIG. 6 is a top, plan schematic view of the microwave heater of FIG. 5.

FIG. 1 illustrates a container 100, such as a cup, with an inner wall 102 and an outer wall 104 that may be made from the sheet material such as paperboard manufactured by the machine system referred to previously and displayed in FIG. 4. A blank for the outer wall 104 may be in the form of a container sleeve or a wall or body of the container 100. The container 100 is not limited to a cup and may be any other container, including but not limited to, a bulk coffee container, a soup tub, press-formed containers, plate, sleeve (e.g., single face corrugated, double face corrugated, non-corrugated, cardboard, etc.), folding cartons, trays, bowls, clamshells, and others with or without covers or sleeves. The container 100 may be a cylindrical cup or a container having other geometrical configurations, including conical, rectangular, etc.

The outer wall 104 blank is not limited to a corrugated die cut blank, and may be constructed of any kind of paperboard, paper, foil, film, fabric, foam, plastic, and etc. The outer wall 104 may be made of any nominal paper stock, including but not limited to, natural single-face, white-topped single face, coated bleached top single-face, corrugate, fluted corrugate or any combination of these. The outer wall 104 may be removable from the container 100 or the outer wall 104 may be adhered to the container 100. The outer wall 104 may be adhered, for example, by laminating the outer wall 104 blank onto the container, using a hot adhesive, cold melt and/or any other adhesive or sealing mechanisms. Alternatively or in addition, the outer wall 104 blank may be adhered with an insulating material. If the outer wall 104 is attached to the cup during manufacture, it may increase efficiency by eliminating an assembly step by the commercial end-user. Further, it may decrease the amount of storage space required by the commercial end-user, e.g., storing one item as opposed to two.

Figure 3:
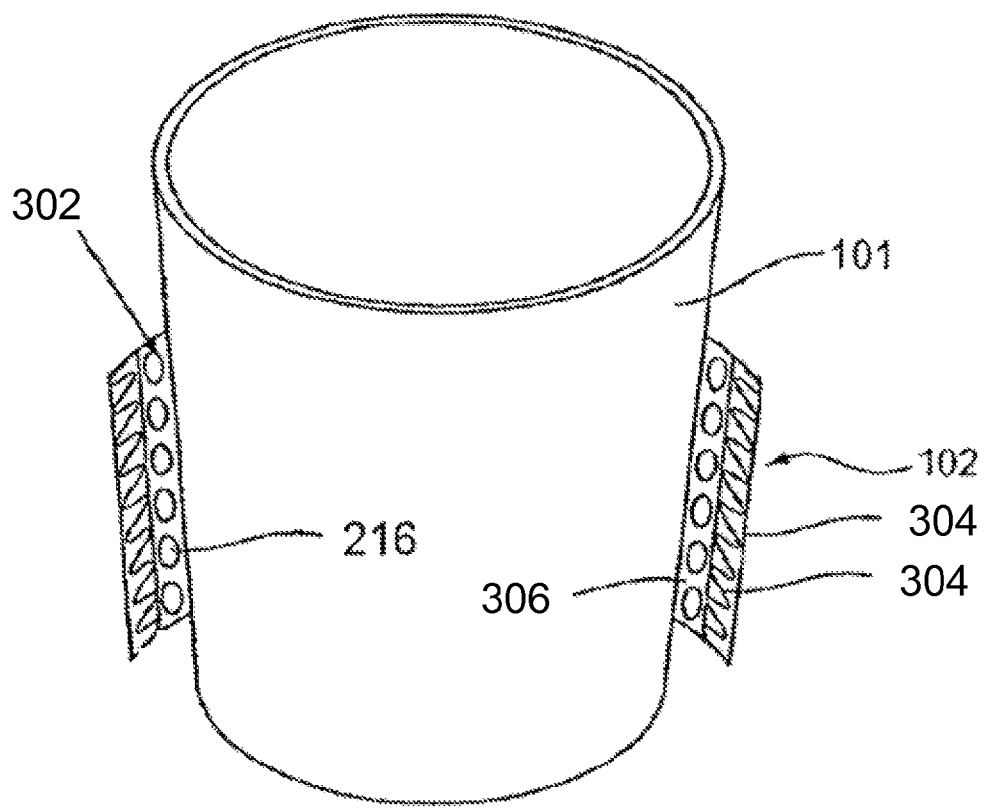
FIG. 3 is a cross-section view of a sleeve with a cup.

FIG. 1 is not necessarily drawn to scale. For example, the outer wall 104 may cover a larger or smaller portion of the surface of the container 100 than illustrated. For example, the outer wall 104 may provide full body coverage. Increasing the surface area of the outer wall 104 may provide a larger insulated area as well as a larger print surface. Although the drawing illustrates the outer wall 104 on a cup, the outer wall 104 may be added to any other containers, such as but not limited to, a bulk beverage container, press-formed container, and soup tub. Alternatively or additionally, the outer wall 104 may be added to a container sleeve (FIG. 3).

Figure 2:
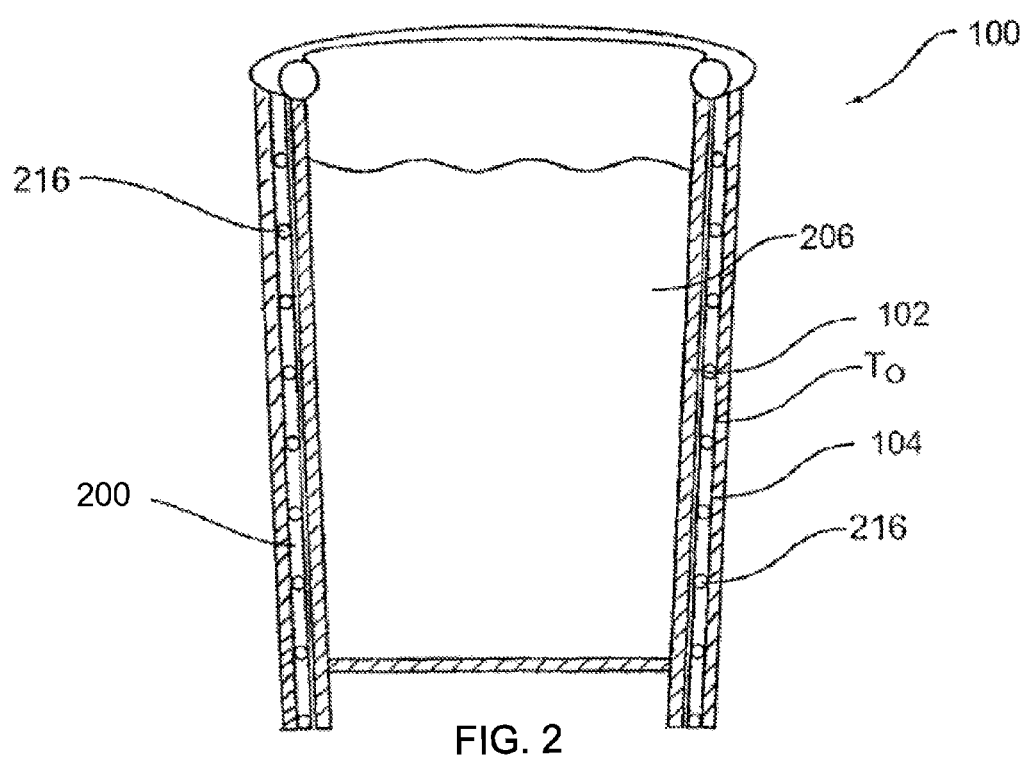
FIG. 2 is a side cutaway view of a double wall cup.

FIG. 2 is a side cutaway view of a container 100, which may be a double wall cup. The container 100 may provide a jacket of air 200 between an outer wall 104 and contents 206, such as a hot or cold beverage or food, of the container 100. The air jacket 200 may provide thermal insulation as measured by an outside surface temperature. The air jacket 200 may partially or completely surround the container 100. When the container 100 is grabbed, a pressure exerted on the outer wall 104 may act to collapse the outer wall 104 at pressure points to reduce the air jacket 200 and potentially initiate contact with an inner wall 102 of the container 100. The air jacket 200 may collapse under pressure points and may give a sense of low rigidity, and the contact may create hot spots on the outer wall 104.

An insulating material 216 applied between the inner wall 102 and the outer wall 104 may reduce or eliminate this effect. If a sufficient amount of insulating material 216 is used, the insulating material 216 may act to provide rigidity without compromising the thermal insulation of the air jacket 200 to the outer wall 104 such that the outer wall 104 does not collapse, completely or partially. The insulating material 216 may add mechanical strength to the container 100. Lighter weight materials may be used to produce the container 100 due to mechanical strength added by the insulating material 216, such that the source of a substrate forming the container 100 may be reduced. The insulating material 216 may be applied in spots, such as dots, or another pattern, either on the inner wall 102, the outer wall 104, or both, such that the insulating material 216 defines an air gap 200 and prevents the outer wall 104 from collapsing onto the inner wall 102 under holding pressure. The insulating material 216 may also provide a rigid feel to the user, while allowing a reduction of a substrate material, for example the inner wall 102 or outer wall 104.

The insulating material 216 may expand when activated, or may be pre-expanded, for example, by the inclusion of air or inert gas, in situ air voids, microspheres, expandable microspheres or other foaming agents. The insulating material 216 may be activated by, for example, temperature or through other methods. In one example, the insulating material 216 may be thermally-activatable by a hot temperature. The insulating material 216 may be an expandable insulating material or adhesive. Additionally or alternatively, the insulating material 216 may include but is not limited to, binder, expandable microspheres or other micro-encapsulated particles, pigment and other additives, adhesives, inert gas foamed hot melt, aqueous coating containing heat-expandable microspheres, starch-based adhesives, natural polymer adhesives, PVC, foam coatings, biodegradable glues, or any combination of these or other materials. The insulating material 216 may include in-situ air voids, microspheres, microparticles, fibers, expandable fibers, dissolving particles, and etc. In one example, the insulating material 216 with microspheres may include a starch composition with a few, such as one to five, percent microspheres mixed into the insulating material 216. The insulating material 216 may be biodegradable, compostable, and/or recyclable.

The insulating material 216 may be expandable when wet or dry. The insulating material 216 may include any synthetic or natural material including aqueous based, solvent based, high solids, or 100% solid materials. The amount of solid content is typically 30% to 80% of the material, and more preferably 40% to 70%. Additional ingredients may be added to the binder and/or insulating material 216, including but not limited to, pigments or dyes, fillers/extenders, surfactants for dispersion, thickeners or solvents to control viscosity for optimized application, foaming agents, additives like waxes or slip aids, and the like. Alternatively, the binder and/or insulating material 216 may be an adhesive. The insulating material 216 may have several properties, including but not limited to thermal insulation to keep container contents hot or cold, absorption of condensation and/or liquid, and/or it may expand on contact with hot material (such as, over 150° F.), and preferably remains inactive before a determined designed activation temperature. For instance, the insulating material 216 would remain inactive at about room temperatures. The insulating material 216 may be repulpable, recyclable, and/or biodegradable.

In a further example an inert gas, such as nitrogen gas, may be injected into the insulating material 216. For example, an inert gas, such as nitrogen gas, may be injected into a hot-melt adhesive, starch-based adhesive, or natural polymer adhesive may be used. The gas may be applied onto the outer surface of the inner wall 102 before placing the outer wall 104 to give these materials foam structure, and therefore improve the mechanical and thermal insulation properties of the double wall container. The gas may be injected into the insulating material 216, for example, before it is applied to the outer wall 104, or during application to outer wall 104.

FIG. 3 illustrates a cross section of an outer wall 104 (FIG. 2), such as a sleeve, assembled with the container 100. This figure is meant to be illustrative and not limiting. The cup may be replaced with any container, for example, a press-formed tray, a soup tub, or a bulk beverage container. The outer wall 104 may have an inner face 306 and an outer face 304. An insulating material 216 may be applied to the inner face 306, the outer face 304, and/or to a surface 302 between the inner face 306 and the outer face 304, such as to an inner wall of the sleeve. The inner face 306 and outer face 304 do not necessarily contain a space 302 between.

An insulating material 216, such as a heat-expandable material, may be applied to an inner face 306 of the outer wall 104 in an active or inactive form. The insulating material 216 may be applied as a thin film that does not materially alter the thickness of the outer wall 104. Applying the insulating material 216 to the inside of the outer wall 104 may also maintain the printability of the outer face of the outer wall 104. If the insulating material 216 on the outer wall 104 is assembled, for example, with a standard paper cup, it may maintain the slim profile of the cup. In the alternative, the heat-expandable material may be activated by the microwaves to expedite expansion thereof during manufacturing, before being assembled as a sleeve. This assures that the expandable adhesive/coating is expanded during manufacturing and provides for additional stiffness and strength after manufacturing and before use.

FIG. 4 is a view of an exemplary machine system 400 for manufacturing packaging material or substrate for making containers such as the container 100 discussed above. For example, the machine system 400 may be a conveyor-type machine system with a number of stages such as the Asitrade microflute lamination machine made by Asitrade AG of Grenchen, Switzerland, cited as merely one example. FIG. 4 provides three parallel views of a process: a view of the machinery, A, a view of a manner in which the sheet material may travel through the machine, B, and a cross-section view of the resulting manufactured product, C. The machine system 400 may extend longitudinally over a considerable length and may include a number of work stations along its length. The sheet materials assembled into the packaging material or substrate travel from right to left along the machine as displayed in FIG. 4.

The machine system 400 may use a first sheet material 402 which may be provided in bulk as a roll or web. The first sheet material 402 may be fed into the machine system 400 and through the various steps of the process by a wheel-based, belt-based, or other conveyance system. FIG. 4 illustrates the use of a wheel-based system. Alternatively or additionally, the machine system 100 may use sheet material which may be pre-printed and may already be die-cut with the pattern or blank of the particular packaging, for example, blanks of cups, containers, plates, clam shells, trays, bags or beverage container holders, among others.

The first sheet material 402 may be composed of a generally flat material having some rigidity and being capable of being bent or scored to facilitate bending along determined lines. For example, the sheet material 402 may be single-face liner paper, for example but not limited to Kraft paper, clay-coated news board, white-top liner, containerboards, solid bleached sulfate (SBS) boards or other materials. The material may be treated, such as to provide increased water or fluid resistance and may have printing on selected portions of the material. Alternatively or additionally, the sheet material 402 may be composed of corrugated cardboard, chipboard, plywood, metalized paper, plastic, polymer, fibers, composite, mixtures or combinations of the foregoing, or the like. The first sheet material 402 may be made of recyclable materials or may be compostable, biodegradable, or a combination of these.

The first sheet material 402 may be conveyed by a roller 408 to a first work station 420. The first work station 420 may be a corrugating station. The first work station 420 may also include a corrugating roll. The corrugating roll may shape the first sheet material 402, or other medium paper, into a series of waves or flutes. In the alternative, a monolayer or single sheet substrate may be passed in directly, without corrugation, as the first sheet material 402 or paper medium.

The first work station 420 may also include an applicator which may apply a securing material to a side, i.e. to the flute top, of the first sheet material 402 or to the side of other medium paper. For example, the applicator may be a trough containing a securing material, such as an adhesive. The trough may be stationed near the corrugating roll such that the adhesive is applied to the tips of the waves or flutes generated by the corrugating roll. Additionally or alternatively, the securing material may be applied by spraying, brushing, or otherwise. For example, an applicator may apply the securing material by spraying it onto a side of the first sheeting (or other medium paper) material 402. The spray from the applicator may be constant or intermittent and may create broken lines, stripes, dots, or ellipses of securing material. Designs and patterns may be applied by moving the applicator or by moving the first sheet material 402 relative to the sprayer.

The securing material may be, for example, an adhesive, a thermal insulating material 216, or other materials or coatings, for example, those with securing properties. Various expandable insulating materials 216 were previously discussed in detail. Furthermore, the securing material may be a hot melt or a non-hot melt adhesive or a cold set adhesive, for example a hot-melt adhesive, starch-based adhesive, natural polymer adhesive, cellulose-based adhesive, glue, hot melt glues, polymeric binders, synthetics, foams, and the like.

The securing material may be delivered to the applicator from a line 422, which may originate at a conditioning and preparation station 432. The microspheres or other expandable insulation material may be premixed with starch, a binder, or other adhesive material in the conditioning and preparation station 432 before delivery to the applicator of the first work station 420.

In some embodiments, the applicator apply may apply a pattern of a heat-expandable coating to the first sheet material or other paper medium, referred to herein as a monolayer sheet, which is then heated by a microwave heater to cause the heat-expandable coating to expand. This coated and patterned monolayer sheet may then be sent to be processed into a final product having the patterned coating.

In still other embodiments, the first sheet material 402 may also be incorporated with a second sheet 404, for example, by pressing the second sheet material 404 to the first sheet material 402. The second sheet material 404 may be secured to the first sheet material 402 by the securing material resulting in a two-layer sheet material 426, such as single-face fluted sheeting as shown in FIG. 4, C.

Any temperatures above a predetermined temperature in the corrugating or first work station 420 may have the negative side effect of over-drying the heat-expandable adhesive or coating, which may cause premature partial expansion of the microspheres in the adhesive or coating. If left too dry, the heat-expandable adhesive or coating would then not have sufficient moisture with which to absorb microwave energy to be rapidly heated. Accordingly, the temperature applied to the combined corrugated board, e.g., a single-face board, at the corrugating station is preferably kept at or below about 200 degrees Fahrenheit.

The two-layer sheet material 426 may then go past or through an industrial microwave heater 427, which may be built around the conveyor belt after the first work station 420 to apply microwaves to the two-layer sheeting. Moisture preferably remains within the heat-expandable insulating material 216 from the mixture prepared in the conditioning and preparation station 432. This moisture is susceptible to absorption of microwave power emanating from the microwave heater 427, and thus heats up rapidly, causing to expand the insulating material 216 of the adhesive/coating applied by the applicator.

The microwave heater 427 is preferably a planar type operated at 915 MHz or 2.45 GHz, or at some other acceptable frequency. The microwave heater 427 may also be a tubular or other type of heater. These types of industrial microwave heaters are commonly used to dry water-containing mixtures or products, which contain polar molecules that absorb the electromagnetic energy in the microwave field, resulting in heating and drying the water, and sometimes in cooking the products. The microwave heater 427, if planar, may include a narrow, open slot in between two panels of the microwave guides or channels for a paper web or other substrate to go through, as seen in FIGS. 5-8. The microwave heater 427 may not only dry the paper web or substrate, but activate and expand the expandable materials pre-applied between the paper layers or on the paper.

The two-layer material sheet 426, such as a single-face fluted sheeting, may exit the machine system 400 and go on to further processing such as die cutting, printing, condition, folding, and the like, which results in a final product. Alternatively, the two-layer sheet material 426 may be further processed by the machine system 400 as described below. Note that the microwave heater 427 may be alternatively located along stations of further processing down the machine system 400. For instance, an expandable adhesive or coating may be applied at a later stage in the process, after which, at some point, the microwave heater 427 may be positioned to expand the adhesive/coating, as discussed later. The location of the microwave heater 427 is therefore not critical, but some locations may be better for ease-of-attachment purposes to the machine system 400 parts.

The two-layer material sheet 426 may be conveyed to a second work station 430. The second workstation 430 may include an applicator which may apply a securing material to a side of the two-layer sheeting 426. For example, the applicator may apply a securing material to the second sheet material 404 side of the two layer sheeting 426, which may be the liner side of the two-layer sheeting 426. Alternatively or additionally, the applicator may apply a securing material to the first sheet material 402 side of the two-layer sheeting 426. The securing material may be or include an expandable adhesive or insulation coating. For example, the securing material may be an adhesive, for example a hot-melt adhesive starch-based adhesive, natural polymer adhesive, cellulose-based adhesive, glue, hot melt glues, cold set glues, binder, synthetics, polymeric binder, foams, and the like.

The securing material may be applied by spraying, brushing, or otherwise. For example, the applicator may be a trough containing a securing material. The trough may be stationed near the roll which feeds the paper into the second work station 430 such that the securing material is applied to the tips of the waves or flutes generated by the corrugating roll. As a second example, an applicator may apply the securing material by spraying it onto a side of the first sheeting material 402, the second sheeting material 404, or both. The spray from the applicator may be constant or intermittent and may create broken lines, stripes, dots, or ellipses of securing material. Designs and patterns may be applied by moving the applicator or by moving the first sheet material 402 relative to the sprayer.

The two-layer sheeting material 426 may be incorporated with a third sheet material 410, which may be a second liner, for example, by pressing the third sheet material 410 to the two-layer sheeting 426, creating a three-layer sheet material 434.

The three-layer sheet material 410 may be composed of a generally-flat material having some rigidity and being capable of being bent or scored to facilitate bending along determined lines. For example, the three-layer sheet material 410 may be single-face liner paper, for example, but not limited to, Kraft paper. The material may be treated, such as to provide increased water or fluid resistance and may have printing on selected portions of the material. Alternatively or additionally, the third sheet material 410 may be composed of corrugated cardboard, chipboard, SBS, metalized paper, plastic, polymer, fibers, composite, mixtures or combination of the foregoing, or the like. The third sheet material 410 may be made of recyclable materials or may be compostable, biodegradable, or a combination of these.

The second work station 430 may be a laminator. The layers of the multilayered sheeting, such as the three-layer sheet material 434, may improve the structural integrity and appearance of the resulting packaging material. The microwave heater 427 may alternatively be located at or near the second work station 430 to radiate with microwave energy the multilayered sheeting passing through the second work station 430, during lamination, for instance. The microwave heater 427 may then rapidly heat, and thus expand, the adhesive or coating—that contains thermally-expandable components such as microspheres—applied to the multilayered sheet as the securing material. The multilayered sheet material leaving the second work station 430 may be further conditioned, cut or die-cut, and stacked for shipping. The multilayered sheet material may then be formed into the container 100.

Several lab feasibility tests have been performed using a common office microwave oven and a pilot planar, industrial microwave heater. E-flute single-face corrugate board and F-flute single-wall corrugated board were used as substrates in these tests. The results from these tests include confirmed the feasibility of activating and expanding the heat-expandable adhesive and coatings sandwiched between medium and liner. The tests also showed an enhancement in drying and reducing steam energy consumption. The tests also revealed that an angular waveguide, for example, a 45-degree-oriented micro-waveguide configuration could be used in-line on the machine system 400 to produce increases in speed of the process commensurate with the process when no heat-expandable adhesives or coatings are used.

Figure 7:
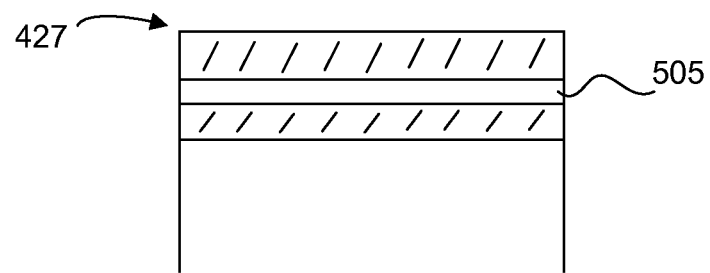
FIG. 7 is a side, plan schematic view of the industrial microwave heater of FIG. 5.
Figure 8:
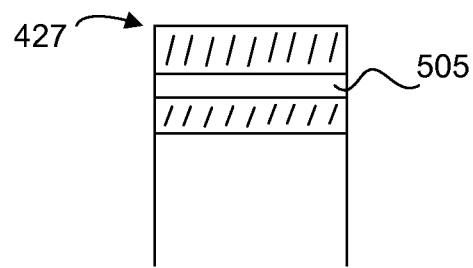
FIG. 8 is a front, cross-section schematic view of the industrial microwave heater of FIG. 5.

FIGS. 5 through 8 include various schematic views of the micro-waveguide(s) that may be used for the microwave heater 427, which may be installed around one or more conveyor belts 503 that convey the paper board, sheet material, or other substrate through the machine system 400. The microwave heater 427 displayed is a planar type having a narrow slot 505 through which the sheet material passes. FIG. 7 shows a cross-machine side view while FIG. 8 shows a front or machine-direction view of the microwave heater 427. The microwave heater 427 may include a number of micro-waveguide channels that are connected together to provide increased surface area with which to radiate the sheet material. The dimensions displayed in FIGS. 5 through 8 of the microwave heater 427 are but exemplary and not meant to be limiting.

Figure 9:
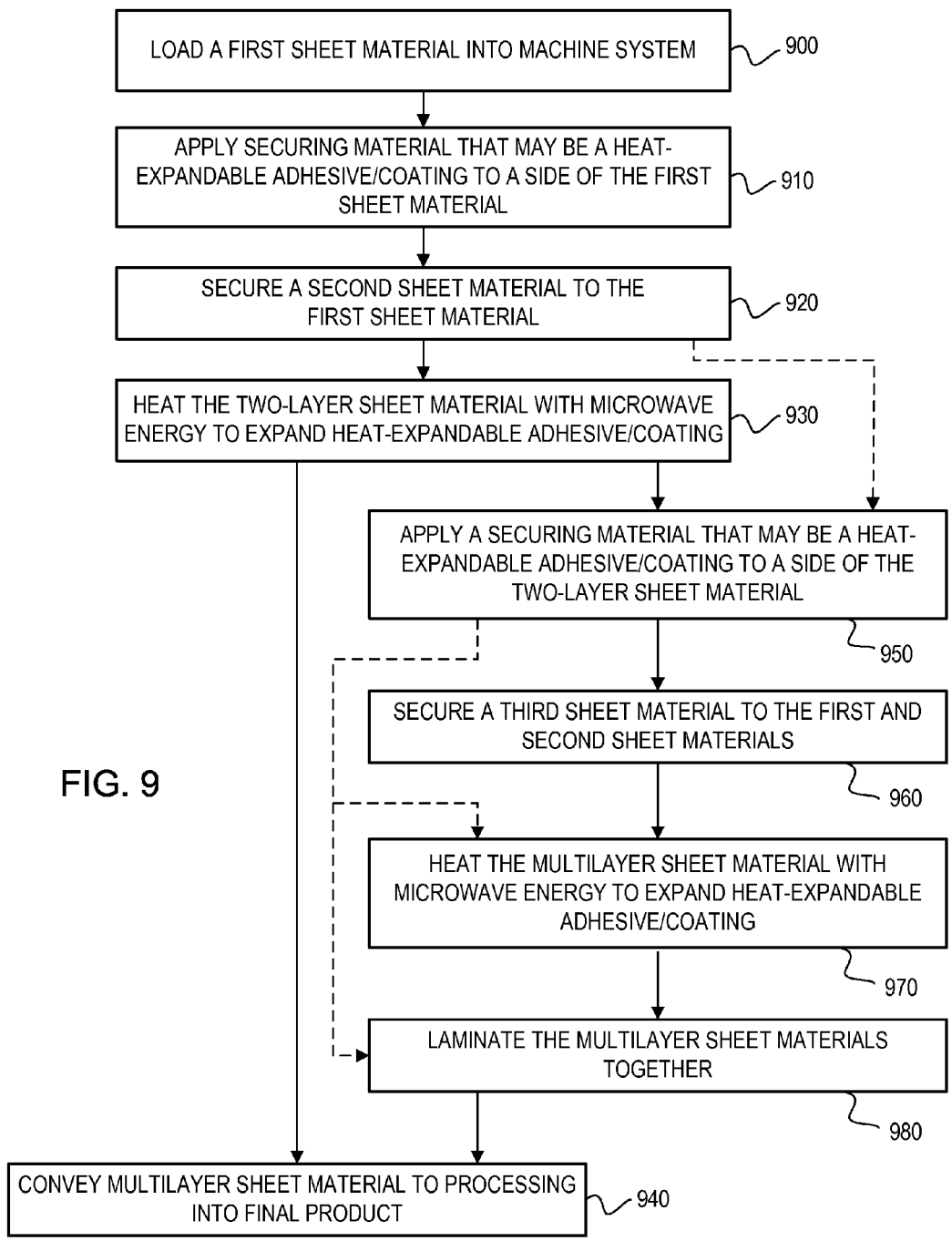
FIG. 9 is a flow chart of an exemplary method for manufacturing a multilayer sheet material in a process that includes microwave heating of the multilayer sheet material to expedite expansion of a heat-expandable adhesive or coating.

FIG. 9 is a flow chart of an exemplary method for manufacturing a multilayer sheet material in a process that includes microwave heating of the multilayer sheet material to expedite expansion of a heat-expandable adhesive or coating. The dashed lines in FIG. 9 include optional routes that may bypass one or more steps of the method. At block 900, a first sheet material may be loaded into the machine system 400 and may be corrugated. At block 910, a securing material may be applied to a side of the first sheet material. The securing material may be a heat-expandable adhesive or coating, which may include a starch and microspheres or some other composition. At block 920, a second sheet material may be applied to the first sheet material. If this two-layer sheet material has a securing material that includes the heat-expandable coating, the two-layer sheet material may be heated at block 930 with microwave energy to expand the heat-expandable adhesive/coating. At block 940, the two-layer sheet material may be conveyed to processing into a final product, such as by printing, die cutting, removing from blanks, and/or being assembled.

At block 950, a second securing material may be applied to a side of the two-layer sheet material. The second securing material may be a heat-expandable adhesive or coating, which may include starch and microspheres and/or some other adequate composition. Following this step, the multilayer sheet material may skip forward certain steps and get heated and/or laminated without first having a third sheet material applied. Otherwise, at block 960, a third sheet material may be applied to an exposed side of the first or second sheet materials. At block 970, if the second securing material is a heat-expandable adhesive or coating, the multilayer sheet material may be heated with microwave energy to expand the heat-expandable adhesive or coating. At block 980, the multiplayer sheet material may be laminated. That is, if the first, second, and third sheet materials have been applied together, then may be laminated together at block 980. At block 940, the multilayer sheet material or substrate may then be processed into a final product, which may include printing, die cutting, being removed from blanks, and/or being assembled.

For example, the resulting multilayer sheet material may be further processed such as by application of and subsequent removal of packaging blanks from the sheet material and assembly of the blanks into the final product (block 940). The final product of the process (which may be, e.g., a cup, container holder, containers sleeve, clamshell, tray, or otherwise) may be made of one or more layers of one or more of the aforementioned materials. Where multiple layers of material are used, they may be joined such as, but not limited to, being laminated, glued, or otherwise fastened together for increased strength.

As mentioned, use of the insulating material 216 may help to reduce the thickness of substrate needed to make the container, sleeves, etc., while maintaining a more rigid feel to the consumer. The insulating material 216 may also improve insulation properties of the container, and to help keep the beverages or foods warm or cold longer, depending on the application. The substrates may be made of natural fibers, synthetic or both, such as SBS (solid bleached sulfate) paper board or box board. A sleeve materials, such as liner and medium, may be produced of 10 LB/1000 $ft^2$ to 100 LB/1000 $ft^2$ material, and preferably 15 LB/1000 $ft^2$ to 40 LB/1000 $ft^2$.

While various embodiments of the invention have been described, it will be apparent to those of ordinary skill in the art that many more embodiments and implementations are possible that are within the scope of the invention. For instance, steps of a method as displayed in the figures or reflected in the below claims do require a specific order of execution by the way they are presented, unless specified. The disclosed steps are listed as exemplary such that additional or different steps may be executed or the steps may be executed in a different order.

We claim:

1. A method for manufacturing a multilayer substrate for packaging, the process comprising:

passing a first, flat sheet material into a conveyor, machine system, the first sheet material having at least two sides;

corrugating the first sheet material;

applying a first securing material to corrugated flutes of a side of the first sheet material, the securing material comprising a heat-expandable adhesive composed of starch or a binder mixed with heat-expandable microspheres;

applying a second, flat sheet material to the side of the first sheet material;

heating the first and second sheet materials with an industrial microwave heater while the first and second sheet materials remain flat, thereby causing to expand the heat-expandable adhesive and forming the multilayer substrate; and processing the multilayer substrate into a final product.

2. The method of claim 1, where the side of the first sheet material comprises a first side, further comprising:

applying a second securing material to a second side of the first sheet material or to the second sheet material;

applying a third, flat sheet material to the second side of the first sheet material or to the second sheet material;

laminating the first, second, and third sheet materials to form a second multilayer substrate; and processing the second multilayer substrate into a final product.

3. The method of claim 2, where the second securing material comprises a second heat-expandable adhesive, the method further comprising:

heating the multilayer substrate having the second securing material to expand the second heat-expandable adhesive after the first heat-expandable adhesive of the first securing material is already expanded.

4. The method of claim 2, where the heat-expandable adhesives comprise starch or other binding material and heat-expandable microspheres.

5. The method of claim 1, where the first sheet material comprises paper.

6. The method of claim 1, where the second sheet material comprises paper.

7. The method of claim 1, where the industrial microwave heater comprises a planar type microwave heater having a plurality of microwave guides surrounding a space through which the sheet materials pass, the microwave heater operable at 915 MHz or at 2.45 GHz.

8. The method of claim 1, further comprising maintaining the first and second sheet materials at or below about 200 degrees Fahrenheit before passage into the industrial microwave heater.

9. A method for manufacturing a multilayer substrate for packaging, the process comprising:

passing a first, flat sheet material into a conveyor, machine system, the first sheet material having at least two sides;

corrugating the first sheet material;

applying a first securing material to corrugated flutes of a first side of the first sheet material;

applying a second, flat sheet material to the first side of the first sheet material;

applying a second securing material to a second side of the first sheet material or to the second sheet material, the second securing material comprising a heat-expandable coating composed of starch or a binder mixed with heat-expandable microspheres;

heating the first and second sheet materials with an industrial microwave heater while the first and second sheet materials remain flat, thereby causing to expand the heat-expandable coating applied thereto;

applying a third, flat sheet material to the first and second sheet materials to form the multilayer substrate; and processing the multilayer substrate into a final product.

10. The method of claim 9, where the industrial microwave heater comprises a planar type microwave heater having a plurality of microwave guides surrounding a space through which the sheet materials pass, the microwave heater operable at 915 MHz or at 2.45 GHz.

11. The method of claim 9, further comprising maintaining the first and second sheet materials at or below about 200 degrees Fahrenheit before passage into the industrial microwave heater.

12. The method of claim 9, where the first sheet material comprises paper.

13. The method of claim 9, where the second sheet material comprises paper.

14. The method of claim 9, where the third sheet material comprises paper.

* * * * *